United States Patent [19]

McGary

[11] Patent Number: 5,521,634
[45] Date of Patent: May 28, 1996

[54] AUTOMATIC DETECTION AND PRIORITIZED IMAGE TRANSMISSION SYSTEM AND METHOD

[75] Inventor: Doug McGary, Rochester, N.Y.

[73] Assignee: Harris Corporation, Melbourne, Fla.

[21] Appl. No.: 261,979

[22] Filed: Jun. 17, 1994

[51] Int. Cl.$^6$ ................................................ H04N 5/225
[52] U.S. Cl. .................... 348/169; 348/151; 348/153; 348/143; 348/170; 348/163
[58] Field of Search .................................. 348/169, 170, 348/142, 143, 152, 153, 154, 155, 162, 163, 164

[56] References Cited

U.S. PATENT DOCUMENTS

| | | | |
|---|---|---|---|
| 4,692,806 | 9/1987 | Anderson et al. | 348/151 |
| 4,739,401 | 4/1988 | Sacks et al. | 348/170 |
| 4,849,486 | 7/1989 | Chodos et al. | 348/169 |
| 4,873,573 | 10/1989 | Thomas et al. | 358/133 |
| 4,876,597 | 10/1989 | Roy et al. | 358/141 |
| 4,905,262 | 2/1990 | Wentworth et al. | 348/164 |
| 4,931,868 | 6/1990 | Kadar | 358/105 |
| 4,951,140 | 8/1990 | Ueno et al. | 358/136 |
| 4,961,211 | 10/1990 | Tsugane et al. | 358/85 |
| 5,001,348 | 3/1991 | Dirscherl et al. | 348/164 |
| 5,027,413 | 6/1991 | Barnard | 348/164 |
| 5,034,986 | 7/1991 | Karmann et al. | 348/170 |
| 5,128,776 | 7/1992 | Scorse et al. | 348/170 |
| 5,182,776 | 1/1993 | Suzuki et al. | 382/14 |
| 5,243,418 | 9/1993 | Kuno et al. | 348/170 |
| 5,270,811 | 12/1993 | Ishibashi et al. | 348/152 |
| 5,285,273 | 2/1994 | James et al. | 348/169 |
| 5,339,104 | 8/1994 | Hong | 348/154 |
| 5,341,439 | 8/1994 | Hsu | 348/169 |
| 5,406,328 | 4/1995 | Chodos et al. | 348/169 |

FOREIGN PATENT DOCUMENTS

| | | |
|---|---|---|
| 2693868 | 1/1994 | France. |
| 9001706 | 2/1990 | WIPO. |

OTHER PUBLICATIONS

European Search Report for Corresponding PTC Application EP 95 30 4056, dated Sep. 28, 1995.

Primary Examiner—Tommy P. Chin
Assistant Examiner—Anand S. Rao
Attorney, Agent, or Firm—Rogers and Killeen

[57] ABSTRACT

An image transmission system and method automatically reduce the size of digital data signals transmitted from visual sensors. The system and method are completely automated and (a) use a plurality of sensors to detect targets in an area of interest, (b) direct a camera to place a target in the camera's field of view, (c) provide a digitized visual image in which the target is identified in a target box, and (d) automatically compress (or otherwise reduce the size of) a digital signal for nontarget portions of the visual image.

15 Claims, 2 Drawing Sheets

AUTOMATIC DETECTION AND PRIORITIZED IMAGE TRANSMISSION SYSTEM AND METHOD

BACKGROUND OF THE INVENTION

The present invention relates video transmission systems, and more specifically to such systems in which the amount of transmitted video information is limited, and in which important video information is automatically selected for transmission.

Many automated security and observation systems include video cameras that view an area of interest. Information from the video camera may be provided real-time via conventional television communication links to a display for monitoring by a human observer, and for storage on tape that may be replayed later. The human observer can identify potential targets (a "target" being any subject that is desirably detected by the system) and manually train the camera for closer observation. In one such system, the railroad car identification system disclosed in U.S. Pat. No. 4,876,597 issued to Roy, et al. Oct. 24, 1989, a fixed video camera is turned on by passage of a train.

In some situations, conventional television communications links for transmitting video information are not adequate. For example, it may be desirable to send video data via a radio transmission system with a bandwidth too narrow to accommodate the desired transmission speeds (e.g., high frequency (HF) radio bandwidth is too narrow for conventional real-time television signals.) One solution to this problem is to transmit less information by eliminating some of the video data. As discussed in U.S. Pat. No. 5,128,776 issued to Scorse, et al. Jul. 7, 1992, an operator may selectively designate important portions of the video data to be transmitted with no or visually lossless compression, and other less significant portions of the data with higher compression. However, human observers are still needed to identify the important portions of the data and the camera field of view.

Where portions of a video image appear consistently and are of predetermined appearance and aspect, such as in a video telephone that displays a human head facing the camera, a processor may locate this predetermined portion of the video image. When the head has been located and a boundary for the video data representing the head has been identified, the processor may reduce the amount of video data being transmitted by reducing the amount of data transmitted for portions outside the boundary relative to portions inside the boundary. (See U.S. Pat. No. 4,951,140 issued to Ueno, et al. Aug. 21, 1990.) However, such a system will only detect targets having the predetermined appearance and aspect.

Movement may also be used to reduce the amount of image data being transmitted. That is, it is known to use moving object detectors to identify movement by comparing sequential video images. Assuming that the moving portions are of interest, the amount of data for portions of the video image that are stationary may be reduced. (See, for example, U.S. Pat. No. 4,692,806 issued to Anderson, et al. Sep. 8, 1987.) In such systems, the moving object detector "tracks" the moving object (in other words, the least compressed portion of image data moves with the moving object). As is apparent, however, image data for an important portion of the image that may not be moving, or that is not moving enough to trigger the moving object detector, may be compressed; for example, important image data for a target may be inadvertently compressed when the target is headed directly for the camera.

Accordingly, it is an object of the present invention to provide a novel image transmission system and method of transmitting images that obviates the problems of the prior art.

It is a further object of the present invention to provide a novel method and video image compression system that automatically detects a target in an area of interest and transmits a digital video image of the target in which nontarget information in the area of interest is automatically compressed before transmission.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

In the system and method of the present invention, the size of digital data signals transmitted from visual sensors are automatically reduced. The system and method are desirably completely automated and (a) use a plurality of sensors to detect targets in an area of interest, (b) direct a camera to place a target in the camera's field of view, (c) provide a digitized visual image in which the target is identified in a target box, (d) automatically compress (or otherwise reduce the size of) a digital signal for nontarget portions of the visual image, and (e) transmit background image data only once (i.e, once background data is sent, it is not re-sent unless a new camera field of view is required).

Figure 1:
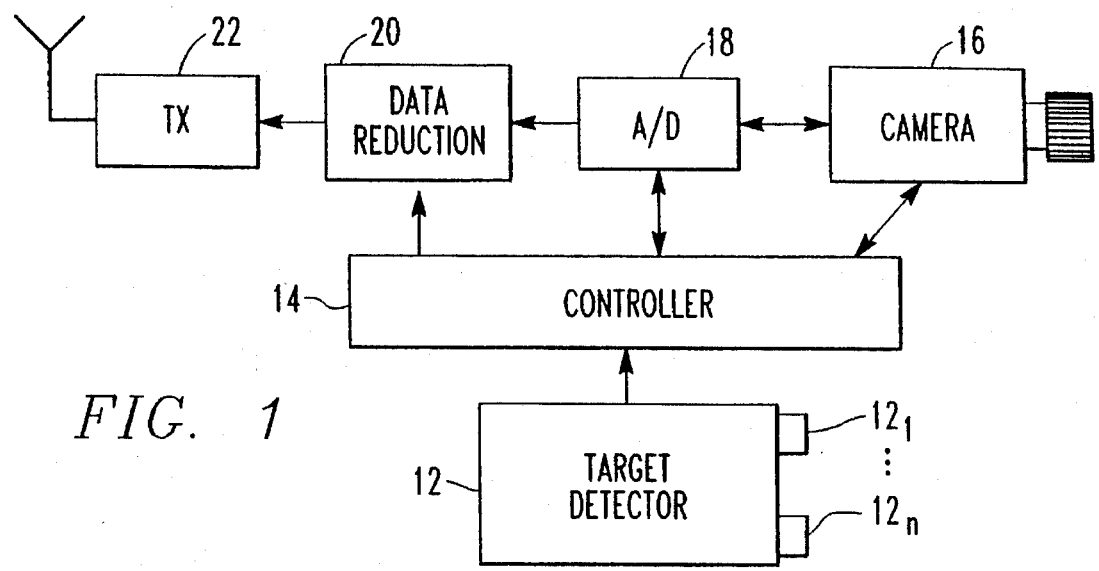
FIG. 1 is a block diagram of an embodiment of the video image transmission system of the present invention.
Figure 2A:
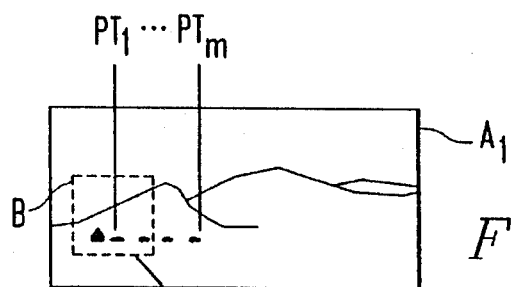
FIGS. 2a–2d are a series of images illustrating the sequence of operation of the present invention.
Figure 2B:
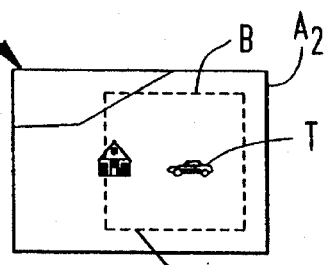

Operation. With reference now to FIG. 1 and to FIGS. 2a–2d, the present invention may include a target detector 12 for locating potential targets $PT_{1 \ldots m}$ in an area of interest $A_1$ (FIG. 2a). The target detector 12 may include at least one, and desirably several, sensors $12_{1 \ldots n}$ for detecting and providing a direction to potential targets. For example, the sensors may be acoustic, seismic, infrared, electromagnetic, trip-wire, visual, and the like.

Information from the target detector 12 is provided to a system controller 14 for evaluation. The system controller 14 determines whether a potential target $PT_i$ is a target T based on all information available to it. The system controller 14 evaluates and correlates information from the sensors to screen potential targets $PT_{1 \ldots m}$ in an area of interest $A_1$.

If a target T is identified, the system controller 14 determines the location of the target T relative to a video camera 16 and provides commands to the video camera 16 so that the target T is placed in the field of view $A_2$ (FIG. 2b) of the video camera 16. To this end, the system controller 14 may determine a bearing and azimuth of the target and define a target box B in which the target is located. A target box B may take any shape and size and need not be a square as illustrated in the figures. For example, target box B may be the periphery of the target T. The system controller 14 coordinates movement of the video camera 16 to place the target box B in the video camera's field of view $A_2$.

Figure 2C:
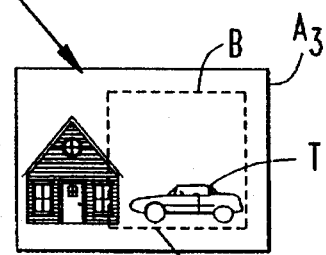

The video camera 16 may be automatically adjusted so that its field of view and focus provide a useable view $A_3$ of the target box B, such as illustrated in FIG. 2c. Desirably the view $A_3$ includes, in addition to the target box B, some of the area of interest $A_1$ adjacent the target box B to provide a view of the environment around the target T. This result may also be achieved by enlarging the area around the target T that is encompassed by the target box B. The video camera 16 generates a signal representing the image $A_3$ that may be digital or converted to digital in an analog-to-digital converter 18. The system controller 14 may use the digital signals from the A/D converter 18 (or signals directly from the video camera) to coordinate movement of the video camera 16 to place the target box B in its field of view.

The digital signals are provided from the system controller 14 to a data reduction unit 20 that operates under the control of the system controller to reduce the amount of data representing the image $A_3$ that will be forwarded to a radio frequency transmitter 22 or other narrow band communications systems for transmission. The reduction unit 20 may selectively compress portions of the data, reduce the resolution of portions of the image to be transmitted, and/or not forward portions of the data to the transmitter 22 at all or only periodically or only when the target moves outside the current field of view of the video camera 16. Desirably the data reduction unit 20 reduces the amount of data representing portions of the video image outside of the target box B, although data representing the target box B may also be reduced to a lesser extent. For example, data representing the target box B may be compressed so that no image data is lost and may be sent without interruption, while the data representing the adjacent area may be compressed and sent only once the first time it comes into the video camera field of view. The extent of data reduction may be preselected, depending in part on the number and nature of the targets expected to be detected and the search environment. For example, where readily identifiable targets are to be searched in a relatively unchanging background (e.g., ships at sea) the background may be sent only once and/or highly compressed, while in a more complex background such as a city street the background may be sent more frequently and/or compressed less.

Figure 2D:
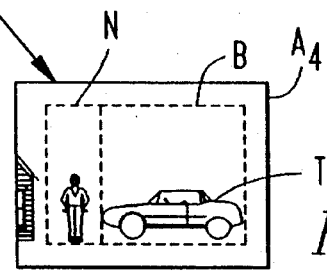

The target T may move, and when it does, the target box B moves with it. Target movement may be determined using video camera 16 signals alone or in combination with information from the target detector 12. With reference to FIG. 2d, as the target box B moves, the system controller 14 coordinates movement of the video camera 16 so that the target box B remains in the camera's new field of view $A_4$.

With further reference to FIG. 2d, when the target T moves it will uncover a previously untransmitted portion of the area of interest. This portion is new adjacent area N and data representing the area N may be forwarded to the transmitter after determination that it does not contain a new target and appropriate data reduction. The data representing the area N may be forwarded in turn or at once regardless of the status of transmission of data representing the remaining adjacent area of interest. Once forwarded, data for the new adjacent area N is treated the same as data from the remaining adjacent area (e.g., periodically or not forwarded again, compressed, resolution reduced).

As will be appreciated, some targets may move enough to first cover and then uncover an adjacent area of interest for which data has already been transmitted. In this event, data for such adjacent areas need not be retransmitted. A receiving unit would recognize this (or receive a signal from the transmitting unit so indicating) and reconstruct the area from the previously transmitted data. Appropriate data storage facilities may be provided.

Plural targets may be tracked and new targets may be added as they are detected, or uncovered when a previously designated target moves.

Hardware. The target detector 12 may be conventional and include at least one of an acoustic, seismic, infrared, electromagnetic, trip-wire, and visual sensors $12_1 \ldots _n$ that can detect and provide an indication of direction to potential targets. Such sensors are well known and need not be discussed herein. In one embodiment of the present invention, the target detector 12 includes several sensors $12_1 \ldots n$ spaced from one another so that range to the target can be determined, although this is not required for the present invention. Sensors of diverse types are desirable so that target information can be correlated to evaluate and screen target types. For example, if only cars are to be tracked, potential targets that do not have the appropriate infrared, or acoustic signal may be ignored.

The system controller 14 and data reduction unit 20 may include components known in the art for performing the various functions discussed above. For example, the patents discussed in the Background of the Invention include components for designating and tracking a moving object, for reducing image data, and for converting signals from a video camera into digital signals. A means for designating and tracking a moving object is also available from Alliant Techsystems of 600 Second Street, NE, Hopkins, Minn., and is used in a preferred embodiment.

The system controller 14 may include a conventional processor and data storage for evaluating the potential targets and for coordinating its various components. Characteristics of potential targets may be stored therein so that signals from the sensors $12_1 \ldots _n$ may be evaluated. The controller 14 may also evaluate the periodicity of features that move, but do not correlate to signals from sensors $12_1 \ldots n$. For example, moving trees or water may be indicated as potential targets by movement alone, and yet it is desirable to reduce the amount of data for such features. Accordingly, where features move in a repeated pattern and do not correlate to other sensors, the system controller 14 may direct the data reduction unit 20 to reduce data for these portions of the image.

The video camera 16 may be a conventional camera for providing signals related to moving images, such as a television camera, a commercial video camera and the like. The analog-to-digital converter 18 and radio frequency transmitter 22 may also be conventional.

Figure 3:
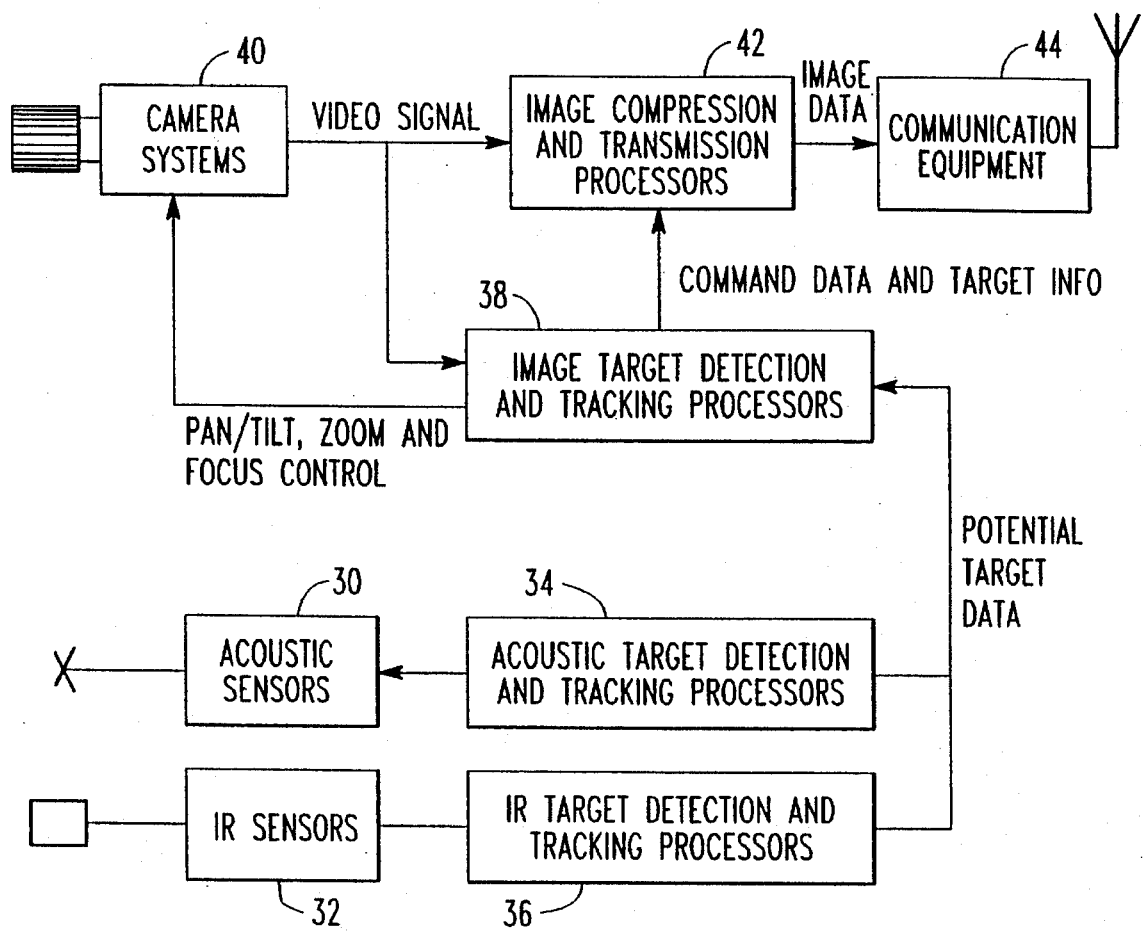
FIG. 3 is a block diagram of a preferred embodiment of the present invention.

With reference now to FIG. 3, a preferred embodiment of the present invention may include conventional acoustic sensors 30 and infrared sensors 32 for detecting potential targets. Each type of sensor may have its own processors 34, 36 for providing information about the potential targets to system controller 38. The acoustic sensors 30 provide information about prominent sound frequencies being received and directions to each, while the infrared sensors 32 indicate that signals that exceed a preselected strength have been received.

Upon indication that a potential target has been found, the controller 38 may provide instructions (e.g., pan, tilt, zoom, focus) to a camera system 40 and the infrared sensors 32 to move them to the bearings indicated by the acoustic sensors for each of the potential targets. The camera system 40 and infrared sensors 32 provide images of the potential targets that are evaluated by the controller 38, along with information from the acoustic sensors 30, to determine whether they are targets. For example, if a potential target emits an acoustic signature that is compatible with signatures for known targets (stored in the controller 38), and the camera and infrared sensors provide corroborating information, the potential target may be identified as a target. The controller 38 evaluates successive frames of image data to reject false alarms and to classify targets.

Once a target is designated, the controller 38 tracks the image of the target (the moving target box discussed above) and provides appropriate movement signals to the camera system 40 to keep the target in the field of view. The infrared sensors 32 may be returned to a detection mode.

The video signals from the camera system 40 are provided to a compression and transmission processor 42 for preparation for transmission. In response to instructions from the controller 38, the processor 42 reduces the amount of data representing the video signal in the manner discussed above (compression, resolution, transmission frequency) and provides the data representing the reduced size video signal to a transmitter 44.

Multiple targets may be identified and tracked by using multiple cameras, by providing a camera field of view large enough to encompass all targets, or by panning a single camera periodically to each target.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A video image compression system for automatically detecting a target in an area of interest and transmitting a digital image of the target wherein a digital image of nontarget information in the area of interest is automatically reduced in size before transmission thereof comprising:

a target detector for searching an area of interest, said target detector detecting at least one of an acoustic, seismic, infrared, electromagnetic, trip-wire, and visual signal related to potential targets;

a system controller for evaluating whether a signal from potential targets detected by said target detector is related to a target, said system controller comprising,
   i) means for evaluating signals from potential targets to determine whether such signals identify a target,
   ii) means for determining a direction to an identified target,
   iii) means for using the determined direction to establish a target box within which the identified target is located, and
   iv) means for following target movement and retaining the target in said target box;

a camera system that receives commands from said system controller for moving said camera system to said target box so that said camera system has said target box in a field of view, said camera system comprising,
   i) means for automatically adjusting the field of view and focus of said camera system so that an image of said target box and a portion of an adjacent area of interest can be generated by said camera system, and
   ii) means for generating a digital signal representing said target box and said adjacent area of interest;

said system controller further comprising,
   v) means for reducing the size of said digital signal of the adjacent area of interest that is to be transmitted,
   vi) means for providing instructions for moving said camera system as said target box moves so that said target box is maintained in said camera system field of view, and
   vii) means for designating a new adjacent area of interest uncovered by movement of said target box for transmission; and means for transmitting on a radio frequency said digital signal of said target box and said reduced size digital signal of said adjacent area of interest.

2. The image compression system of claim 1 wherein said means for reducing the size of said digital signal comprises means for transmitting said digital signal of said adjacent area of interest periodically.

3. The image compression system of claim 1 wherein said means for reducing the size of said digital signal comprises means for transmitting said digital signal of said adjacent area of interest when it first appears in said camera system field of view and not thereafter.

4. The image compression system of claim 1 wherein said means for following target movement comprises means for evaluating a periodicity of moving portions of the digital image.

5. The image compression system of claim 1 further comprising means for compressing said digital signal representing said target box.

6. The image compression system of claim 1 wherein said target detector comprises an acoustic sensor and an infrared sensor.

7. The image compression system of claim 6 wherein said camera system comprises a video camera, and wherein said means for evaluating potential targets comprises means for evaluating signals from said video camera, said acoustic sensor and said infrared sensor.

8. A method of automatically detecting a target in an area of interest and transmitting a digital image of the target wherein a digital image of nontarget information in the area of interest is reduced in size before transmission thereof, the method comprising the steps of:

a) searching an area of interest with an automated target detector, the target detector detecting at least one of an acoustic, seismic, infrared, electromagnetic, trip-wire, and visual signal related to a potential target;

b) upon detection of signal related to a potential target by the target detector, evaluating the detected signal in a system controller to determine whether the potential target is a target;

c) upon determination that the potential target is a target, determining in the system controller a direction to the target;

d) the system controller using the determined direction to establish a target box within which the target is located and thereafter retained by following target movement;

e) providing a signal from the system controller to a camera system for moving the camera system so that the camera system has the target box in the camera system field of view;

f) automatically adjusting the field of view and focus of the camera system so that an image of the target box and a portion of an adjacent area of interest may be generated by the camera system;

g) generating a digital signal of the image of the target box and adjacent area of interest with the camera system;

h) reducing the size of the digital signal of the adjacent area of interest;

i) transmitting the digital signal of the target box and the reduced size signal of the adjacent area of interest;

j) providing signals from the system controller for moving the field of view of the camera system as the target box moves so that the target box is maintained in the camera system field of view; and k) transmitting the digital signal of a new adjacent area of interest uncovered by the movement of the target box.

9. The method of claim 8 wherein multiple targets are detected and separate target boxes are established for each of the multiple targets.

10. The method of claim 8 wherein the digital signal of the adjacent area of interest is transmitted periodically.

11. The method of claim 8 wherein the digital signal of the adjacent area of interest is transmitted only the first time it appears in the camera system field of view.

12. The method of claim 8 wherein when movement of the target box uncovers a new adjacent area of interest, the digital signal of the uncovered adjacent area of interest is transmitted immediately.

13. The method of claim 8 wherein the digital signal of the adjacent area of interest is compressed to a predetermined first level.

14. The method of claim 8 wherein the digital signal of the adjacent area of interest is transmitted only when a new adjacent area is required because of target movement.

15. The method of claim 13 wherein the digital image of the target box is compressed to a second level less than the first level.

* * * * *